(12) United States Patent
Kwon

(10) Patent No.: US 11,377,062 B2
(45) Date of Patent: Jul. 5, 2022

(54) SEAT AIRBAG FOR VEHICLE

(71) Applicants: Hyundai Motor Company, Seoul (KR); Kia Motors Corporation, Seoul (KR)

(72) Inventor: Hyock In Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/693,254

(22) Filed: Nov. 23, 2019

(65) Prior Publication Data

US 2020/0384941 A1 Dec. 10, 2020

(30) Foreign Application Priority Data

Jun. 4, 2019 (KR) ........................ 10-2019-0066226

(51) Int. Cl.
*B60R 21/207* (2006.01)
*B60R 21/2338* (2011.01)
*B60R 21/233* (2006.01)
*B60R 21/231* (2011.01)
*B60R 21/00* (2006.01)

(52) U.S. Cl.
CPC .......... *B60R 21/233* (2013.01); *B60R 21/207* (2013.01); *B60R 21/2338* (2013.01); *B60R 21/23138* (2013.01); *B60R 2021/0044* (2013.01); *B60R 2021/0048* (2013.01); *B60R 2021/0055* (2013.01); *B60R 2021/23146* (2013.01); *B60R 2021/23308* (2013.01); *B60R 2021/23382* (2013.01); *B60R 2021/23386* (2013.01)

(58) Field of Classification Search
CPC ............ B60R 21/207; B60R 21/23138; B60R 21/233; B60R 21/2338; B60R 21/231; B60R 2021/0044; B60R 2021/0048; B60R 2021/0055; B60R 2021/23146; B60R 2021/23308; B60R 2021/23386; B60R 2021/0006
USPC ..................... 280/730.2, 743.2, 730.1, 743.1
See application file for complete search history.

(56) References Cited

U.S. PATENT DOCUMENTS

| 8,360,469 | B2 | 1/2013 | Wiik et al. |
| 9,663,061 | B2 * | 5/2017 | Mihm ............... B60R 21/23138 |
| 10,000,177 | B2 | 6/2018 | Mihm |
| 10,023,147 | B2 | 7/2018 | Kwon |
| 10,300,878 | B2 | 5/2019 | Park et al. |

(Continued)

FOREIGN PATENT DOCUMENTS

| DE | 202017103033 U1 * | 6/2017 | ......... B60R 21/2338 |
| DE | 10 2017 008166 A1 | 4/2018 | |

(Continued)

*Primary Examiner* — Keith J Frisby
(74) *Attorney, Agent, or Firm* — Fox Rothschild LLP

(57) ABSTRACT

A seat airbag for a vehicle is installed in a side part of a seat back and an airbag cushion thereof is deployed forward. A front portion of the cushion is divided into a head chamber disposed at an upper location, a chest chamber disposed at a central location and a pelvis chamber disposed at a lower location. The airbag protects a vehicle occupant while wrapping around the occupant with use of a first tether to a fourth tether that are integrally formed into a single string and connect the respective chambers to each other.

21 Claims, 11 Drawing Sheets

(56) References Cited

U.S. PATENT DOCUMENTS

| | | | |
|---|---|---|---|
| 10,543,801 B2 | 1/2020 | Kwon | |
| 10,814,824 B2 | 10/2020 | Song et al. | |
| 10,974,686 B2 | 4/2021 | Moon | |
| 2015/0158453 A1 | 6/2015 | Fujiwara | |
| 2015/0274110 A1 | 10/2015 | Ishida et al. | |
| 2015/0314748 A1 | 11/2015 | Mihm | |
| 2018/0118150 A1* | 5/2018 | Kwon | B60R 21/207 |
| 2018/0326938 A1 | 11/2018 | Rickenbach et al. | |
| 2019/0054890 A1* | 2/2019 | Kwon | B60R 21/23138 |
| 2019/0061675 A1* | 2/2019 | Kwon | B60R 21/233 |
| 2019/0061676 A1 | 2/2019 | Kwon | |
| 2019/0283700 A1* | 9/2019 | Kwon | B60R 21/207 |
| 2020/0047705 A1* | 2/2020 | Moon | B60R 21/2338 |
| 2021/0146874 A1 | 5/2021 | Lee et al. | |

FOREIGN PATENT DOCUMENTS

| | | | | |
|---|---|---|---|---|
| DE | 202018004452 U1 * | 10/2018 | | B60R 21/207 |
| DE | 10 2018 215098 A1 | 3/2019 | | |
| JP | 2014-128634 A | 7/2014 | | |
| KR | 1020180049404 | 5/2018 | | |
| KR | 1020190020254 | 2/2019 | | |
| KR | 1020190021905 | 3/2019 | | |
| KR | 1020190036178 | 4/2019 | | |
| WO | 2020/141737 A1 | 7/2020 | | |

\* cited by examiner

US 11,377,062 B2

SEAT AIRBAG FOR VEHICLE

CROSS REFERENCE TO RELATED APPLICATION

The present application claims priority to Korean Patent Application No. 10-2019-0066226, filed Jun. 4, 2019, the entire contents of which is incorporated herein for all purposes by this reference.

BACKGROUND

Field of the Invention

The present invention relates to a seat airbag for a vehicle, and more particularly, to a seat airbag provided in a seat of the vehicle and configured to deploy sideward of a vehicle occupant while simultaneously protecting the head, chest, and pelvis of the occupant.

Description of the Related Art

In general, autonomous vehicles are designed to include freely rotatable seats whereby vehicle occupants in front seats and rear seats are able to face each other. However, such a configuration increase a risk that an airbag which protects a vehicle occupant against collisions by restraining the occupant in a fixed position may not be able to perform such a function properly.

Therefore, for an autonomous vehicle, an airbag needs to be installed in a seat itself to sufficiently protect the vehicle occupant. It is also required that this airbag is used in a general vehicle other than the autonomous vehicle to reduce the number of airbags provided at various positions, thereby reducing manufacturing cost and more effectively protecting the occupant by restraining the occupant directly in the seat.

The foregoing is intended merely to aid in the understanding of the background of the present invention, and is not intended to mean that the present invention falls within the purview of the related art that is already known to those skilled in the art.

SUMMARY

Accordingly, the present invention provides a seat airbag for a vehicle that is installed in a seat of the vehicle and configured to deploy sideward of a vehicle occupant while simultaneously protecting the head, chest, and pelvis of the occupant.

According to one aspect of the present invention, a seat airbag for a vehicle installed in a side part of a seat back and an airbag cushion of the seat airbag may be deployed forward, and a front portion of the cushion may be divided into a head chamber disposed at an upper location, a chest chamber disposed at a central location and a pelvis chamber disposed at a lower location. The airbag may include: a first tether disposed at an inner side of the cushion facing a vehicle occupant, and having a first end connected to a gas injection portion of the side part of the seat back and a second end connected to the chest chamber; a second tether disposed at the inner side of the cushion, and having a first end connected to the second end of the first tether and a second end connected to the head chamber; a third tether disposed at an outer side of the cushion opposite the occupant, and having a first end connected to the second end of the second tether and a second end connected to the pelvis chamber; and a fourth tether disposed at the inner side of the cushion, and having a first end connected to the second end of the third tether and a second end connected to the chest chamber.

The first, second, third, and fourth tethers may be integrally formed into a single string, and the second end of the first tether may pass through a first aperture of the chest chamber, the second end of the second tether passes through a second aperture of the head chamber, and the second end of the third tether passes through a third aperture of the pelvis chamber. The second end of the fourth tether may be fixed to a lower end of the chest chamber.

The fourth tether may be disposed at the inner side of the cushion, and the fourth tether may have the first end connected to the second end of the third tether, and the second end connected to a point between the first and the second end of the first tether. The second end of the first tether may be connected to a front upper end of the chest chamber. The chest chamber may include a chest dead zone disposed in an upper portion thereof in a recess shape recessed toward a center thereof, and thus, upon airbag deployment, the chest chamber may be pulled by the first tether and a front portion of the chest chamber may be bent toward an occupant's chest with respect to the chest dead zone.

The airbag may further include a fifth tether disposed at the inner side of the cushion facing the occupant, and having a first end connected to the second end of the fourth tether and a second end connected to the gas injection portion of the side part of the seat back. The first end of the first tether may be connected to the gas injection portion at a position above the second end of the fifth tether. The first end of the first tether and the second end of the fifth tether may be fixed to the cushion, an inflator, or a seat back frame. The second end of the first tether may be connected to a front upper end of the chest chamber, and the second end of the fourth tether may be connected to a lower end of the chest chamber.

The first tether to the fifth tether may be formed into a string shape in which the first and second ends thereof are connected to each other, and the second end of the first tether may pass through a first aperture of the chest chamber, the second end of the second tether may pass through a second aperture of the head chamber, the second end of the third tether may pass through a third aperture of the pelvis chamber, and the second end of the fourth tether may pass through a fourth aperture of the chest chamber.

The second end of the first tether and the second end of the fifth tether may be connected to each other while passing through a fifth aperture formed in the gas injection portion. The first end of the first tether may be fixed to an upper point of a seat back frame. The chest chamber may include a front auxiliary chamber disposed in a front portion thereof and divided from the chest chamber by a front dead zone, and the second end of the first tether may be connected to the front auxiliary chamber.

The head chamber may include an upper auxiliary chamber disposed in an upper portion thereof and defined from the head chamber by an upper dead zone, and the second end of the second tether may be connected to the upper auxiliary chamber. The chest chamber may include an extension chamber disposed in a front portion thereof and extending to be bent upward, and the second end of the first tether may be connected to the extension chamber. The chest chamber may include a guide panel disposed at an inner side thereof facing the occupant, and the first tether may extend through a space between the chest chamber and the guide panel whereby the first tether may come into close or abutting contact with the chest chamber. All of the first tether to the fourth tether may be made of a stretchable material, or at least one of the tethers may be partially made of the stretchable material.

According to the seat airbag for a vehicle according to the present invention, the airbag may be installed in a seat of the vehicle and may be deployed sideward of a vehicle occupant while simultaneously protecting the head, chest, and pelvis of the occupant.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION

Figure 1:
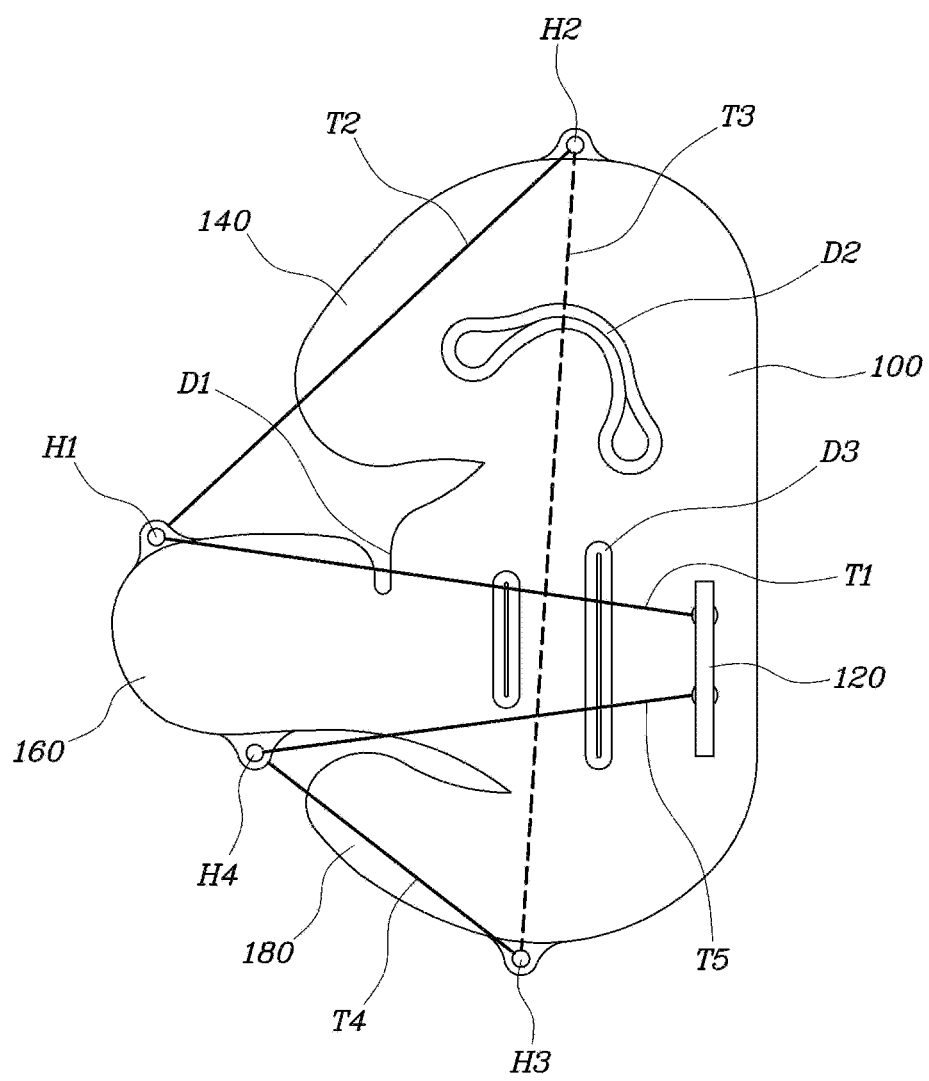
FIGS. 1 and 2 are views showing a seat airbag for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of the present invention will be described in detail with reference to the accompanying drawings. Throughout the drawings, the same reference numerals will refer to the same or like parts.

The seat airbag for a vehicle according to the present invention may be installed in a side part of a seat back and an airbag cushion 100 thereof may be deployed forward, and a front portion of the cushion 100 may be divided into a head chamber 140 disposed at an upper location, a chest chamber 160 disposed at a central location, and a pelvis chamber 180 disposed at a lower location. The upper location, central location, and lower location are relative to each other. In other words, the upper location may refer to an uppermost region of the cushion and the lower location may refer to a lowermost region of the cushion while the central location is disposed therebetween.

In particular, airbag may include: a first tether T1 disposed at an inner side of the cushion 100 facing a vehicle occupant, and having a first end connected to a gas injection portion 120 of the side part of the seat back and a second end connected to the chest chamber 160; a second tether T2 disposed at the inner side of the cushion 100, and having a first end connected to the second end of the first tether T1 and a second end connected to the head chamber 140; a third tether T3 disposed at an outer side of the cushion 100 opposite the occupant, and having a first end connected to the second end of the second tether T2 and a second end connected to the pelvis chamber 180; and a fourth tether T4 disposed at the inner side of the cushion 100, and having a first end connected to the second end of the third tether T3 and a second end connected to the chest chamber 160.

The airbag according to the present invention is effective for an autonomous vehicle in which the seats are freely rotatable, and even for a general vehicle, is efficient by preventing a large number of airbags from being necessary. Furthermore, the airbag according to the present invention protects the occupant while wrapping around the occupant from a seat and thus is more efficient for occupant protection.

In particular, the airbag according to the present invention may be installed in a seat back frame F, and the cushion 100 may be deployed forward from the side part of the seat back through an inflator. Furthermore, as shown in FIG. 1, the cushion 100 is configured such that a deployment part has one volume while a front portion may be divided into three chambers. The chambers include the head chamber 140 disposed at the upper location, the chest chamber 160 disposed at the central location, and the pelvis chamber 180 disposed at the lower location.

Figure 2:
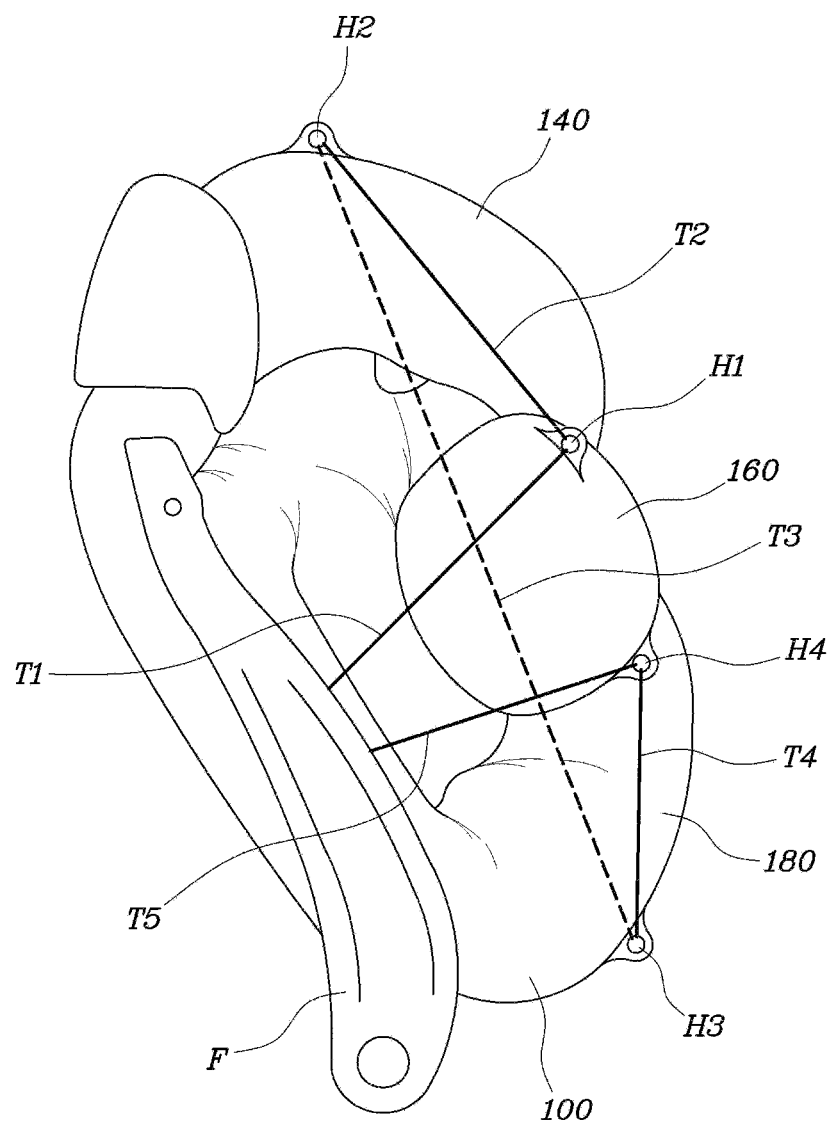

The head chamber 140 protects an occupant's head, the chest chamber 160 protects an occupant's chest, and the pelvis chamber 180 restrains an occupant's pelvis. In particular, the chest chamber 160 may have a shape bent to wrap around the front of the chest of the occupant. Accordingly, even when the chest chamber 160 is deployed forward upon deployment, the chest chamber 160 is required to be bent during deployment into a shape bent toward the occupant as shown in FIG. 2. Thus, the present invention employs multiple tethers that allow the chest chamber 160 to be bent toward the occupant's chest, and provide tension forces that the head chamber 140 and the pelvis chamber 180 use to support and restrain the occupant's head and pelvis on the side of the occupant.

FIGS. 1 and 2 show the same exemplary embodiment, in which FIG. 1 is a plan view showing the cushion in an unfolded state and FIG. 2 is a perspective view showing the cushion in a deployed state. In FIG. 1, multiple tethers are shown, and the actual length of each of the tethers is shorter than that shown in FIG. 1. When a short tether is used, each of the chambers is deformed as shown in FIG. 2. In FIG. 1, a long tether is shown for the sake of understanding.

In FIG. 1, the first tether T1 to the fifth tether T5 are all shown. In particular, the first tether T1 may be disposed at the inner side of the cushion 100 facing the occupant and comes into contact with the occupant. The first tether T1 may have the first end connected to the gas injection portion 120 of the side part of the seat back and the second end connected to the chest chamber 160. Accordingly, when the cushion 100 is deployed, the first tether T1 pulls the chest chamber 160 toward the occupant as shown in FIG. 2.

The second tether T2 may also be disposed at the inner side of the cushion and may have the first end connected to the second end of the first tether T1 and the second end connected to the head chamber 140 to support the head chamber 140. Furthermore, the third tether T3 may be disposed at the outer side of the cushion 100 opposite to the occupant and may have the first end connected to the second end of the second tether T2 and the second end connected to the pelvis chamber 180. Therefore, the third tether T3 does not come into contact with (e.g., remains spaced apart from) the occupant and allows the head chamber 140, the chest chamber 160, and the pelvis chamber 180 to be gathered together to support each other in a vertical direction.

Furthermore, the fourth tether T4 may be disposed at the inner side of the cushion 100 and may have the first end connected to the second end of the third tether T3 and the second end connected to the chest chamber 160 to pull the chest chamber 160 toward the occupant together with the first tether T1. The fifth tether T5 may be disposed at the inner side of the cushion 100 opposite to the occupant and may have the first end connected to the second end of the fourth tether T4 and the second end connected to the gas injection portion 120 of the side part of the seat back to support the pelvis chamber 180.

Through such a connection relationship between the tethers, the head chamber 140, the chest chamber 160, and the pelvis chamber 180 have a shape gathered together as shown in FIG. 2, and in particular, the chest chamber 160 has a shape bent toward the occupant's chest as shown in FIG. 2. Therefore, through such shapes and a supporting force of the chambers, an upper body of the occupant seated in a seat may be maintained restrained and prevented from being thrown or thrust forward during a collision, and impact may be absorbed by the cushion.

Meanwhile, the first tether T1, the second tether T2, the third tether T3, the fourth tether T4, and the fifth tether T5 may be formed into a string shape (e.g., as a cord) in which the first and second ends thereof are connected to each other. In particular, the second end of the first tether T1 may pass through a first aperture H1 of the chest chamber 160, the second end of the second tether T2 may pass through a second aperture H2 of the head chamber 140, the second end of the third tether T3 may pass through a third aperture H3 of the pelvis chamber 180, and the second end of the fourth tether T4 may pass through a fourth aperture H4 of the chest chamber 160. Through such a connection relationship between the tethers, the tethers share tension forces therebetween and affect each other, and when the occupant is loaded on a first side of the cushion, the tethers on a second side of the cushion are pulled taught and restrain the occupant effectively.

Furthermore, as shown in FIG. 1, the first end of the first tether T1 may be connected to the gas injection portion 120 at a position above the second end of the fifth tether T5. Accordingly, both upper and lower portions of the chest chamber 160 may be pulled toward the occupant, thereby supporting both upper and lower portions of the occupant's chest. The first end of the first tether T1 and the second end of the fifth tether T5 may be connected to the gas injection portion 120 of the side part of the seat back. The gas injection portion 120 may be the cushion 100, the inflator, or the seat back frame F.

Additionally, the second end of the first tether T1 may be connected to the front upper end of the chest chamber 160, and the second end of the fourth tether T4 may be connected to the lower end of the chest chamber 160. In other words, the first tether T1 may be disposed at a position above the fourth tether T4 and may be connected to the front portion of the chest chamber 160. Accordingly, upon cushion deployment, the chest chamber 160 may be deployed while the front portion thereof is bent slightly upward by the first tether T1. Such a deployed shape prevents a phenomenon in which an occupant's arm and the chest chamber 160 interfere with each other. In other words, while the chest chamber 160 may be deployed slightly upward to avoid the occupant's arm upon deployment, the chest chamber 160 may be bent toward the occupant's chest again after the chest chamber 160 is deployed to some extent, thus restraining the occupant while simultaneously wrapping around the occupant's chest and arm together.

Figure 3:
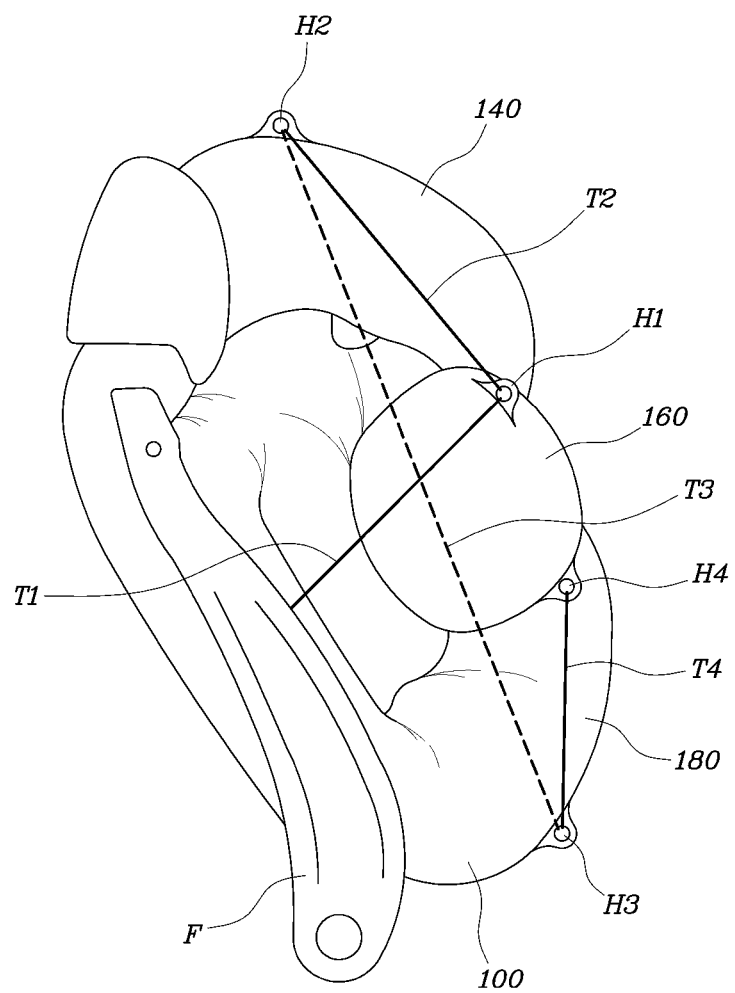
FIGS. 3 to 11 are views showing a seat airbag for a vehicle according to other exemplary embodiments of the present invention.
Figure 4:
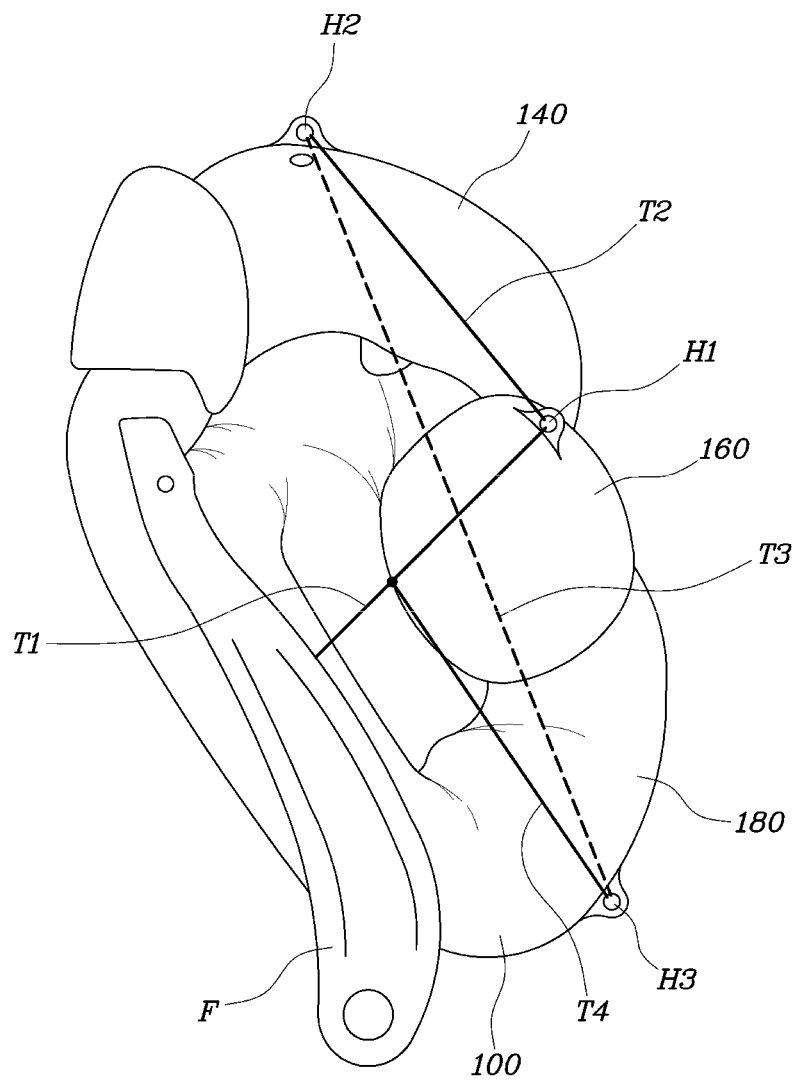

On the other hand, FIG. 3 shows a seat airbag for a vehicle according to another exemplary embodiment of the present invention, in which a second end of a fourth tether T4 may be fixed to a lower end of a chest chamber 160. In this exemplary embodiment, as in the exemplary embodiment of FIG. 2, an effective occupant protection during a collision may be ensured. In an exemplary embodiment, referring to FIG. 4, a fourth tether T4 may be disposed at an inner side of an airbag cushion 100 and may have a first end connected to a second end of a third tether T3 and a second end connected to a point between a first end and second end of a first tether T1.

Figure 5:
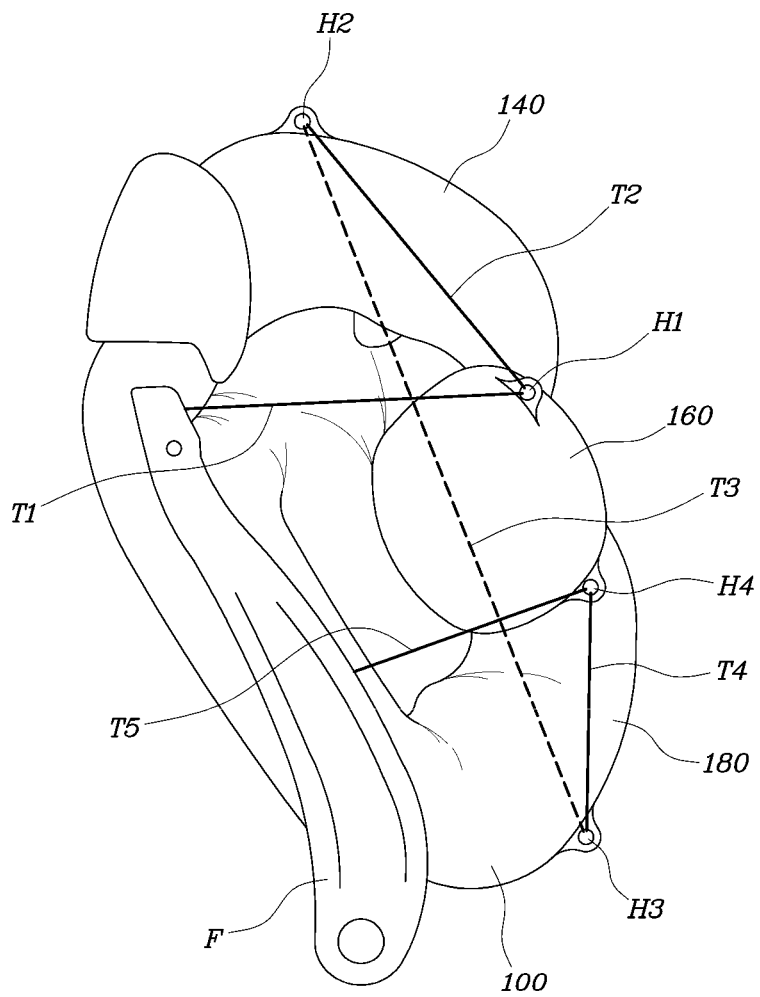
Figure 6:
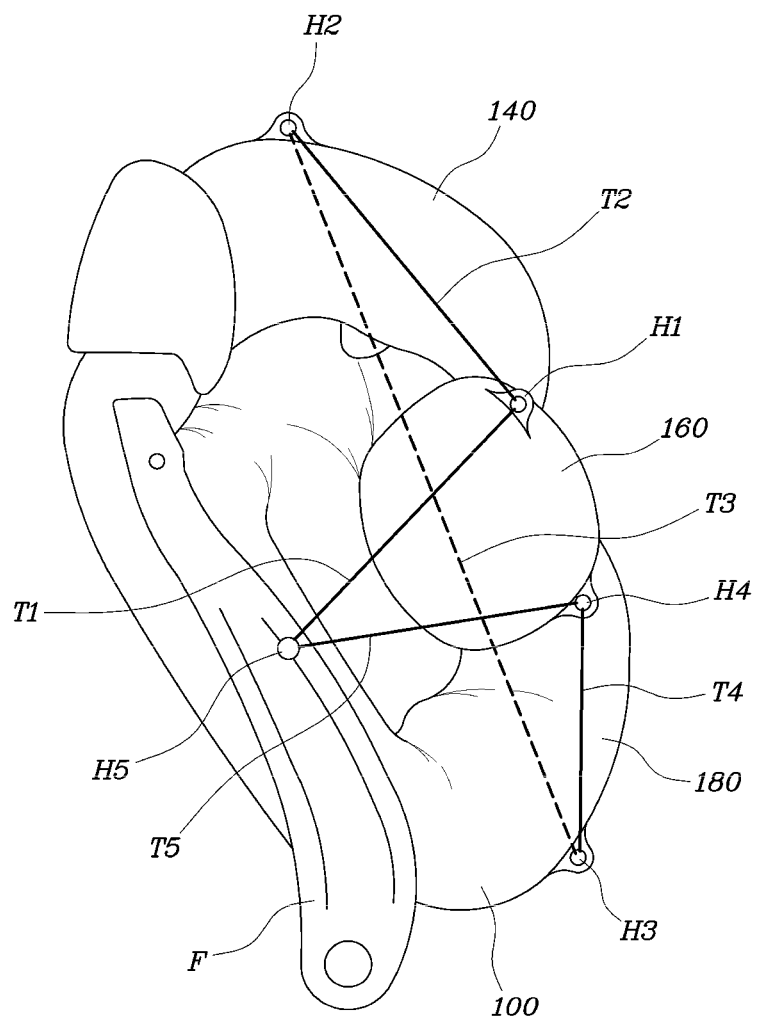

In an exemplary embodiment, referring to FIG. 5, a first end of a first tether T1 may be fixed to an upper point of a seat back frame F. In this exemplary embodiment, it may be possible that a chest chamber 160 is guided to be more actively deployed upward when the chest chamber 160 is deployed and a first tether T1 may restrain an occupant's shoulder as well. In another exemplary embodiment, referring to FIG. 6, a second end of a first tether T1 and a second end of a fifth tether T5 may be connected to each other while passing through a fifth aperture H5 formed in a gas injection portion 120, thus forming a ring or ribbon shape connected to each other rather than a single string or cord. Accordingly, tension forces of remaining tethers more actively affect each other.

Meanwhile, the chest chamber 160 may include a chest dead zone D1 provided in an upper portion thereof in a recess shape recessed toward a center thereof. Therefore, upon airbag deployment, the chest chamber 160 may be pulled by the first tether T1 and a front portion of the chest chamber 160 may be bent toward the occupant's chest with respect to the chest dead zone D1. In other words, the chest dead zone D1 makes it possible that a point at which the chest chamber 160 is bent toward the occupant may be set in advance and also the chest chamber 160 is more actively bent.

Figure 7:
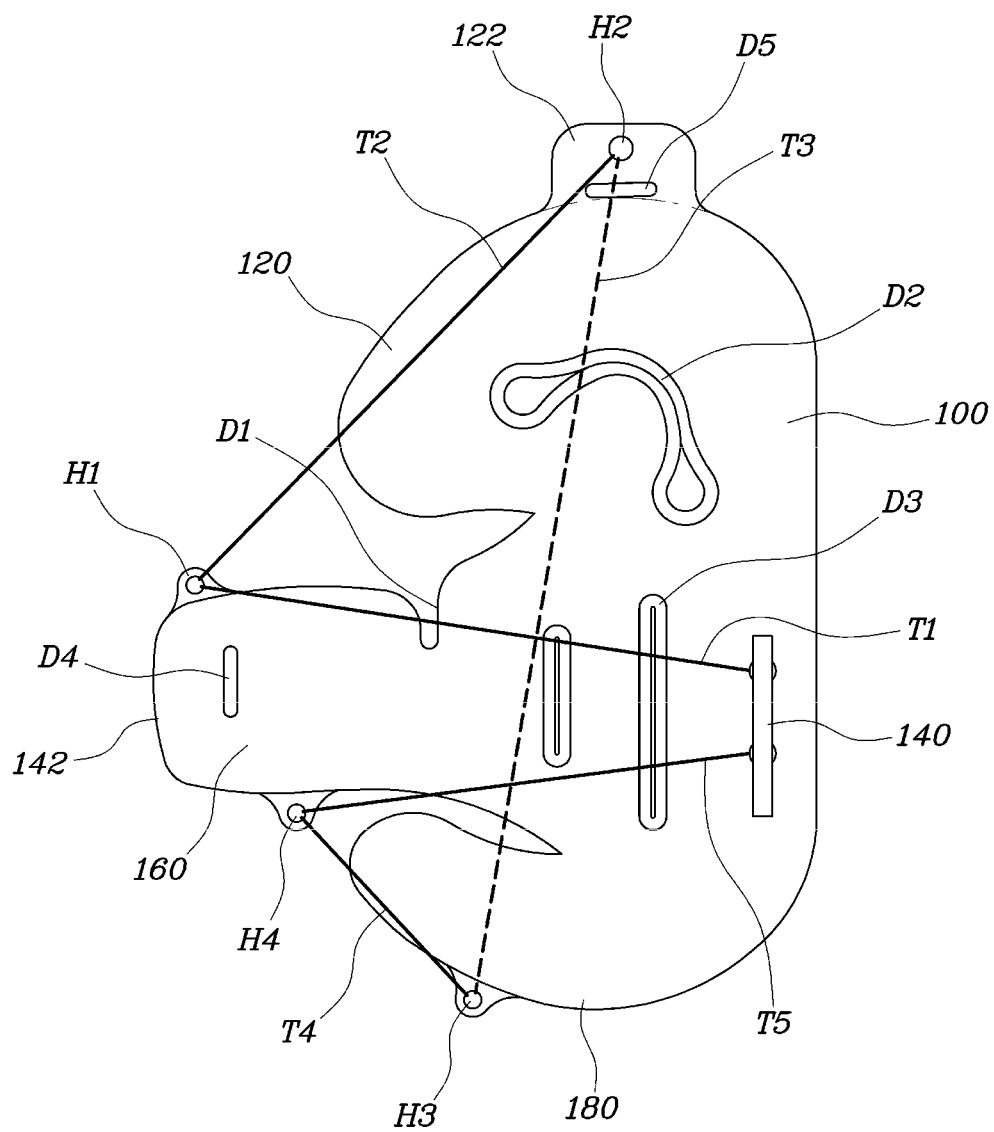

In an exemplary embodiment, referring to FIG. 7, a chest chamber 160 may include a front auxiliary chamber 142 provided in a front portion thereof and divided from the chest chamber 160 by a front dead zone D4, and a second end of a first tether T1 may be connected to the front auxiliary chamber 142. Furthermore, a head chamber 140 may include an upper auxiliary chamber 122 provided in an upper portion thereof and defined from the head chamber 140 by an upper dead zone D5, and a second end of a second tether T2 may be connected to the upper auxiliary chamber 122. Such a configuration makes it possible for the head chamber 140 to further wrap around the occupant's chest and head and provide more protection. This configuration also reduces the amount of movement of the occupant's chest and head, thereby restraining the occupant more effectively.

Figure 8:
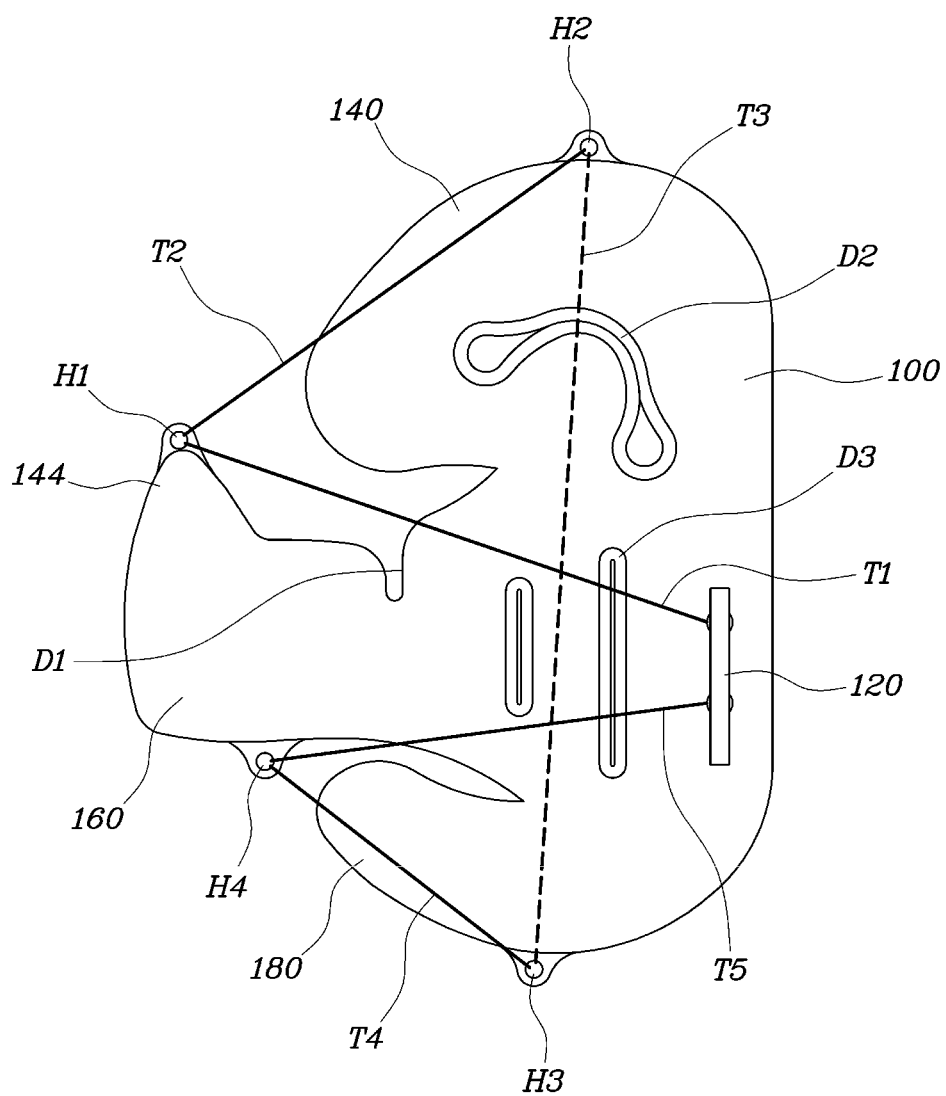

In an exemplary embodiment, referring to FIG. 8, a chest chamber 160 may include an extension chamber 144 provided in a front portion thereof and extending to be bent upward, and a second end of a first tether T1 may be connected to the extension chamber 144. In this exemplary embodiment, it may also be possible that the chest chamber 160 further extended provides more protection to the occupant's chest, and at the same time the chest chamber 160 bent upward reduces interference with the occupant's arm, and the extension chamber 144 wraps around the occupant's shoulder to restrain the occupant more effectively.

Figure 9:
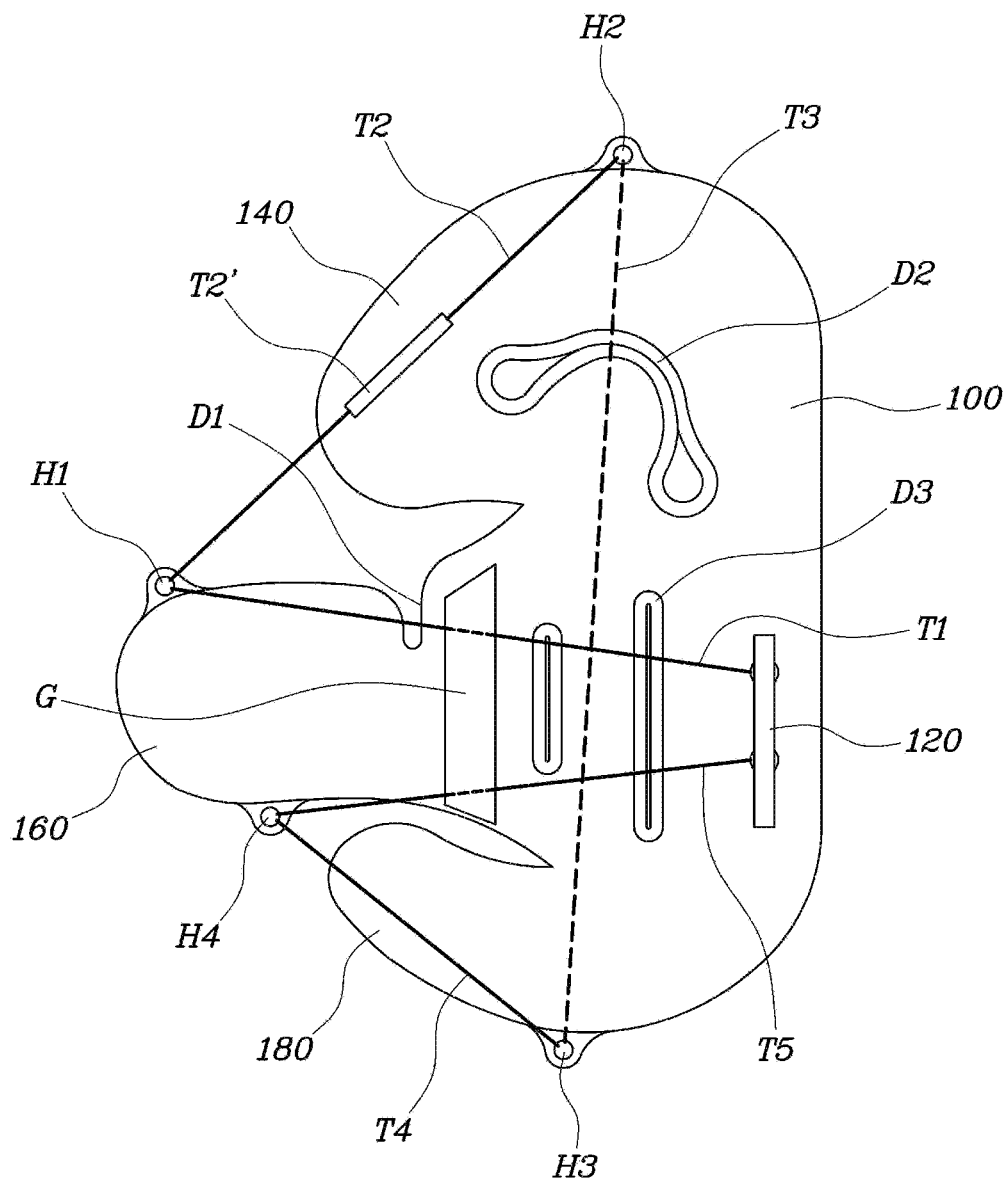

In an exemplary embodiment, referring to FIG. 9, a chest chamber 160 may include a guide panel G provided at an inner side thereof facing the occupant, and a first tether T1 may extend through a space between the chest chamber 160 and the guide panel G whereby the first tether T1 comes into close or abutting contact with the chest chamber 160. This prevents the first tether T1 from unintentionally pushing the occupant but enables the first tether T1 coming into close contact with the chest chamber 160 to effectively transmit a required tension force without pushing the occupant. The fifth tether T5 may have the same configuration as described above.

In an exemplary embodiment, the first tether T1, the second tether T2, the third tether T3, and fourth tether T4 may be entirely made of a stretchable material, or at least one of the tethers may be partially made of a stretchable material. In other words, all of the tethers may be entirely made of a stretchable material such as elastic rubber, silicone, or the like. Alternatively, as shown in FIG. 9, only a portion T2' of the second tether T2 may be made of a stretchable material. The use of such a material allows the tethers to shrink and wrap around the occupant in more close contact therewith after cushion deployment, thereby providing more protection to the occupant.

Figure 10:
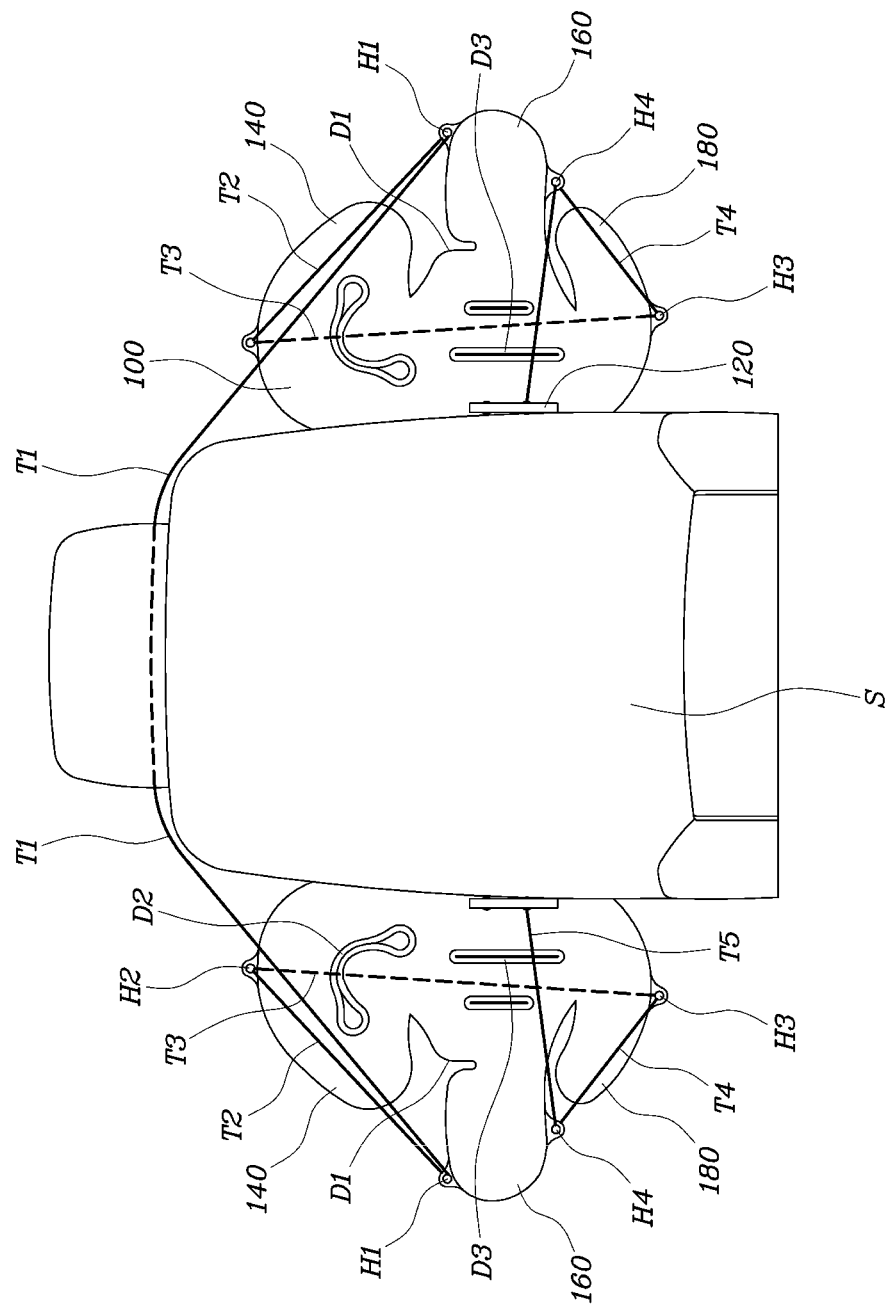

FIG. 10 is a view showing a state in which the airbag according to the present invention is mounted in a seat of a vehicle. Herein, the airbag according to the present invention may be installed in each of left and right sides of a seat. Furthermore, the respective first tethers T1 may be connected to each other to be stretched across the back of a headrest upon airbag deployment and thus, the left and right airbags may be mutually supported against each other.

Figure 11:
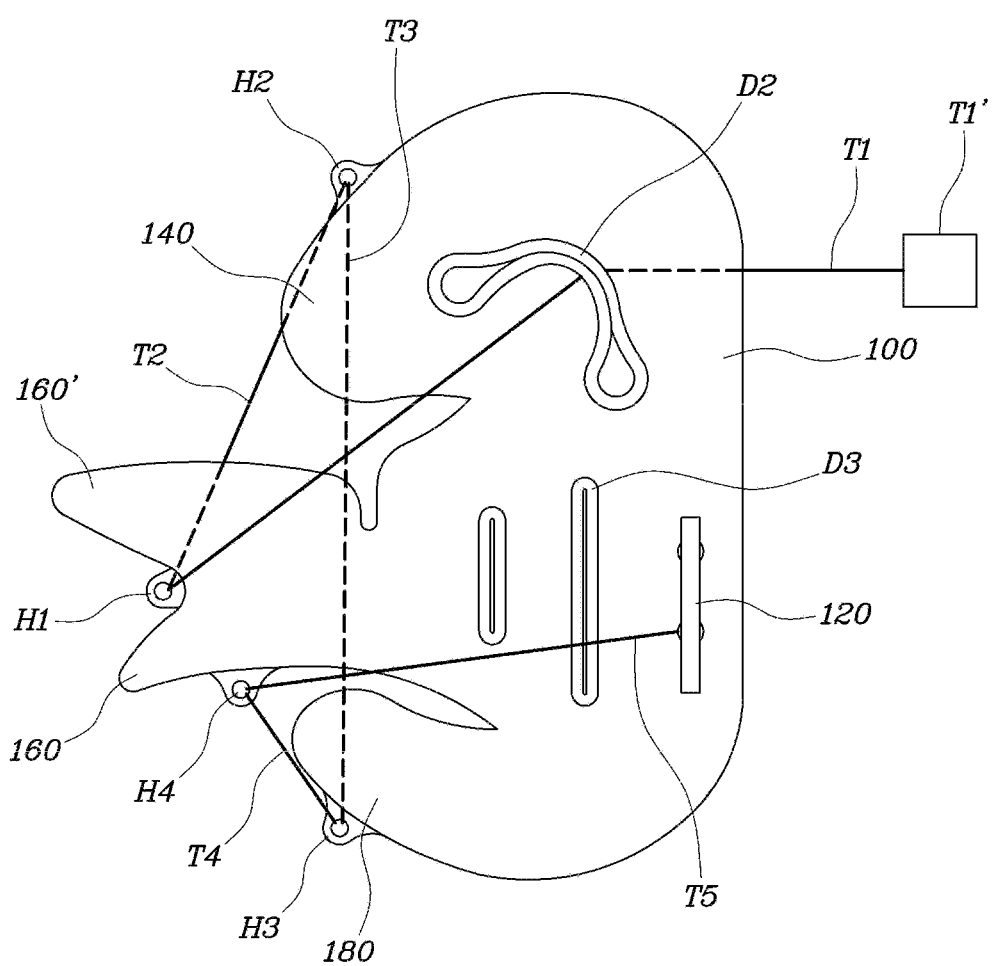

Furthermore, FIG. 11 shows a seat airbag for a vehicle according to still another exemplary embodiment of the present invention. In this exemplary embodiment, a first tether T1 may pass through a dead zone D2 and may be fixed to another frame T1' of a seat, thereby making it possible to prevent the tethers from being unintentionally caught by the seat or occupant upon airbag deployment. In addition, an extension portion 160' extends from a front portion of a cushion and thus, the extension portion 160' may pass through a space between a seat belt and an occupant's neck in a relaxed posture of the seat, thereby preventing the occupant's neck from being injured.

According to the seat airbag for a vehicle according to the present invention, the airbag may be installed in a seat of the vehicle and may deploy sideward of a vehicle occupant while simultaneously protecting the head, chest, and pelvis of the occupant.

Although the exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A seat airbag for a vehicle installed in a side part of a seat back, an airbag cushion thereof deployed forward, and a front portion of the cushion is divided into a head chamber disposed at an upper location, a chest chamber disposed at a central location and a pelvis chamber disposed at a lower location, the airbag comprising:
    a first tether disposed at an inner side of the cushion facing a vehicle occupant, and having a first end connected to a gas injection portion of the side part of the seat back and a second end connected to the chest chamber;
    a second tether disposed at the inner side of the cushion, and having a first end connected to the second end of the first tether and a second end connected to the head chamber;
    a third tether disposed at an outer side of the cushion opposite the vehicle occupant, and having a first end connected to the second end of the second tether and a second end connected to the pelvis chamber; and
    a fourth tether disposed at the inner side of the cushion, and having a first end connected to the second end of the third tether and a second end connected to the chest chamber.

2. The airbag of claim 1, wherein the first tether, the second tether, the third tether, and the fourth tether are integrally formed into a single string, and the first tether to the fourth tether are configured such that the second end of the first tether passes through a first aperture of the chest chamber, the second end of the second tether passes through a second aperture of the head chamber, and the second end of the third tether passes through a third aperture of the pelvis chamber.

3. The airbag of claim 1, wherein the second end of the fourth tether is fixed to a lower end of the chest chamber.

4. The airbag of claim 1, wherein the fourth tether is disposed at the inner side of the cushion, the first end of the fourth tether is connected to the second end of the third tether, and the second end of the fourth tether is connected to a point between the first and the second end of the first tether.

5. The airbag of claim 1, wherein the second end of the first tether is connected to a front upper end of the chest chamber.

6. The airbag of claim 5, wherein the chest chamber includes a chest dead zone provided in an upper portion thereof in a recess shape recessed toward a center thereof and upon airbag deployment, the chest chamber is pulled by the first tether and a front portion of the chest chamber is bent toward a chest region of the vehicle occupant with respect to the chest dead zone.

7. The airbag of claim 1, further comprising:
    a fifth tether disposed at the inner side of the cushion facing the vehicle occupant, and having a first end connected to the second end of the fourth tether and a second end connected to the gas injection portion of the side part of the seat back.

8. The airbag of claim 7, wherein the first end of the first tether is connected to the gas injection portion at a position above the second end of the fifth tether.

9. The airbag of claim 7, wherein the first end of the first tether and the second end of the fifth tether are fixed to the cushion, an inflator, or a seat back frame.

10. The airbag of claim 7, wherein the second end of the first tether is connected to a front upper end of the chest chamber, and the second of the fourth tether is connected to a lower end of the chest chamber.

11. The airbag of claim 7, wherein the first tether, the second tether, the third tether, the fourth tether, and the fifth tether are formed into a string shape in which first and second ends thereof are connected to each other, and the second end of the first tether passes through a first aperture of the chest chamber, the second end of the second tether passes through a second aperture of the head chamber, the second end of the third tether passes through a third aperture of the pelvis chamber, and the second end of the fourth tether passes through a fourth aperture of the chest chamber.

12. The airbag of claim 7, wherein the second end of the first tether and the second end of the fifth tether are connected to each other while passing through a fifth aperture formed in the gas injection portion.

13. The airbag of claim 1, wherein the first end of the first tether is fixed to an upper point of a seat back frame.

14. The airbag of claim 1, wherein the chest chamber includes a front auxiliary chamber provided in a front portion thereof and divided from the chest chamber by a front dead zone, and the second end of the first tether is connected to the front auxiliary chamber.

15. The airbag of claim 1, wherein the head chamber includes an upper auxiliary chamber provided in an upper portion thereof and defined from the head chamber by an upper dead zone, and the second end of the second tether is connected to the upper auxiliary chamber.

16. The airbag of claim 1, wherein the chest chamber includes an extension chamber provided in a front portion thereof and extending to be bent upward, and the second end of the first tether is connected to the extension chamber.

17. The airbag of claim 1, wherein the chest chamber includes a guide panel provided at an inner side thereof facing the vehicle occupant, and the first tether extends through a space between the chest chamber and the guide panel and the first tether comes into abutting contact with the chest chamber.

18. The airbag of claim 1, wherein the first tether, the second tether, the third tether, and the fourth tether are made of a stretchable material, or at least one of the tethers is partially made of the stretchable material.

19. The airbag of claim 1, wherein the airbag is installed in each of left and right sides of a seat of the vehicle, and the respective first tethers of the airbags are connected to each other to be stretched across a back of a headrest of the seat upon airbag deployment, and the left and right airbags are mutually supported against each other.

20. The airbag of claim 1, wherein the first end of the first tether passes through a dead zone of the head chamber and is fixed to a frame of a seat.

21. The airbag of claim 1, wherein the chest chamber includes an extension portion that extends upward from a point where the second end of the first tether is connected to the chest chamber, and the extension portion passes through a space between a seat belt and a neck of the vehicle occupant in a relaxed posture of a seat.

* * * * *